United States Patent
Narasimhamurthy

(10) Patent No.: US 12,524,397 B2
(45) Date of Patent: Jan. 13, 2026

(54) AUTOMATED BATCH GENERATION AND SUBSEQUENT SUBMISSION AND MONITORING OF BATCHES PROCESSED BY A SYSTEM

(71) Applicant: Charter Communications Operating, LLC, St. Louis, MO (US)

(72) Inventor: Anthahkarana Narasimhamurthy, Waxhaw, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 401 days.

(21) Appl. No.: 17/335,683

(22) Filed: Jun. 1, 2021

(65) Prior Publication Data
US 2022/0382748 A1 Dec. 1, 2022

(51) Int. Cl.
*G06F 16/23* (2019.01)

(52) U.S. Cl.
CPC ...... *G06F 16/2386* (2019.01); *G06F 16/2365* (2019.01)

(58) Field of Classification Search
None
See application file for complete search history.

(56) References Cited

U.S. PATENT DOCUMENTS

| | | | | |
|---|---|---|---|---|
| 8,639,653 B2* | 1/2014 | Linder | .................. | G06F 9/4881 |
| | | | | 707/602 |
| 9,811,863 B1* | 11/2017 | Marinescu | ............. | G06Q 40/08 |
| 11,386,083 B1* | 7/2022 | Jose | ........................ | G06F 16/284 |
| 2011/0246434 A1* | 10/2011 | Cheenath | ............ | G06F 16/2386 |
| | | | | 707/703 |
| 2012/0030247 A1* | 2/2012 | Yambal | ................. | G06F 16/119 |
| | | | | 707/E17.058 |
| 2013/0247050 A1* | 9/2013 | Watanabe | ........... | G06F 11/3433 |
| | | | | 718/101 |
| 2016/0149991 A1* | 5/2016 | Ables | ....................... | H04L 67/06 |
| | | | | 707/827 |
| 2019/0340156 A1* | 11/2019 | Gupta | ..................... | G06F 16/00 |
| 2021/0349743 A1* | 11/2021 | Panchomarthi | ....... | H04L 9/0819 |

* cited by examiner

*Primary Examiner* — Neveen Abel Jalil
*Assistant Examiner* — John J Morris
(74) *Attorney, Agent, or Firm* — Dority & Manning, P.A.

(57) ABSTRACT

Automated batch generation and subsequent submission and monitoring of batches processed by a system is disclosed. A plurality of records to be submitted to a system for processing is accessed. A plurality of record groups is generated, each record group corresponding to a different subset of records. A plurality of batch transaction records is generated. Each batch transaction record corresponds to one of the plurality of record groups, and includes a subset identifier that references a subset of records of a record group to which the batch transaction record corresponds, and a status field. A first batch transaction record that identifies a first subset of records is accessed. The status field of the first batch transaction record is set to a submitted value, and instructions are sent to the system to process the first subset of records.

19 Claims, 7 Drawing Sheets

| BATCHSEQ | SUBSET ID | MB_NAME | MB_STATUS | STATUS |
|---|---|---|---|---|
| 64 | 40 | 66 | 68 | 42 |

AUTOMATED BATCH GENERATION AND SUBSEQUENT SUBMISSION AND MONITORING OF BATCHES PROCESSED BY A SYSTEM

BACKGROUND

A system may be provided a large number of records to process in a single processing cycle. If a problem arises at any point in the processing cycle, the entire processing may need to be reversed. If the problem arises near the end of the processing cycle, then a substantial amount of time and computing resources may have been expended for no benefit. It may also be desirable to spread the processing of a large number of records over a number of processing cycles to, for example, allow the processing to be initiated during non-peak usage times.

SUMMARY

The embodiments disclosed herein provide mechanisms for automatically generating subsets of records from a large number of records, and successively causing the subsets of records to be processed by a system, while concurrently monitoring the processing of the records by the system.

In one embodiment a method is provided. The method includes accessing, by a processor device set comprising one or more processor devices, a plurality of records to be submitted to a system for processing. The method further includes generating a plurality of record groups, each record group corresponding to a different subset of records of a plurality of subsets of records of the plurality of records. The method further includes generating a plurality of batch transaction records, each batch transaction record corresponding to one of the plurality of record groups, and comprising: 1) a subset identifier that references a subset of records of a record group to which the batch transaction record corresponds, and 2) a status field. The method further includes accessing a first batch transaction record that identifies a first subset of records of the plurality of subsets of records. The method further includes setting the status field of the first batch transaction record to a submitted value that indicates that the first subset of records is being processed by the system. The method further includes sending, to the system, instructions to process the first subset of records.

In another embodiment a computer system is provided. The computer system includes a processor device set comprising one or more processor devices of one or more computing devices. The processor device set is configured to access a plurality of records to be submitted to a system for processing. The processor device set is further configured to generate a plurality of record groups, each record group corresponding to a different subset of records of a plurality of subsets of records of the plurality of records. The processor device set is further configured to generate a plurality of batch transaction records, each batch transaction record corresponding to one of the plurality of record groups, and comprising: 1) a subset identifier that references a subset of records of a record group to which the batch transaction record corresponds, and 2) a status field. The processor device set is further configured to access a first batch transaction record that identifies a first subset of records of the plurality of subsets of records. The processor device set is further configured to set the status field of the first batch transaction record to a submitted value that indicates that the first subset of records is being processed by the system, and send, to the system, instructions to process the first subset of records.

In another embodiment a non-transitory computer-readable storage medium is provided. The non-transitory computer-readable storage medium includes executable instructions to cause one or more processor devices to access a plurality of records to be submitted to a system for processing. The instructions further cause the one or more processor devices to generate a plurality of record groups, each record group corresponding to a different subset of records of a plurality of subsets of records of the plurality of records. The instructions further cause the one or more processor devices to generate a plurality of batch transaction records, each batch transaction record corresponding to one of the plurality of record groups, and comprising: 1) a subset identifier that references a subset of records of a record group to which the batch transaction record corresponds, and 2) a status field. The instructions further cause the one or more processor devices to access a first batch transaction record that identifies a first subset of records of the plurality of subsets of records. The instructions further cause the one or more processor devices to set the status field of the first batch transaction record to a submitted value that indicates that the first subset of records is being processed by the system, send, to the system, instructions to process the first subset of records.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 3 is a block diagram of a layout of a batch transaction record according to another embodiment;

DETAILED DESCRIPTION

Figure 1A:
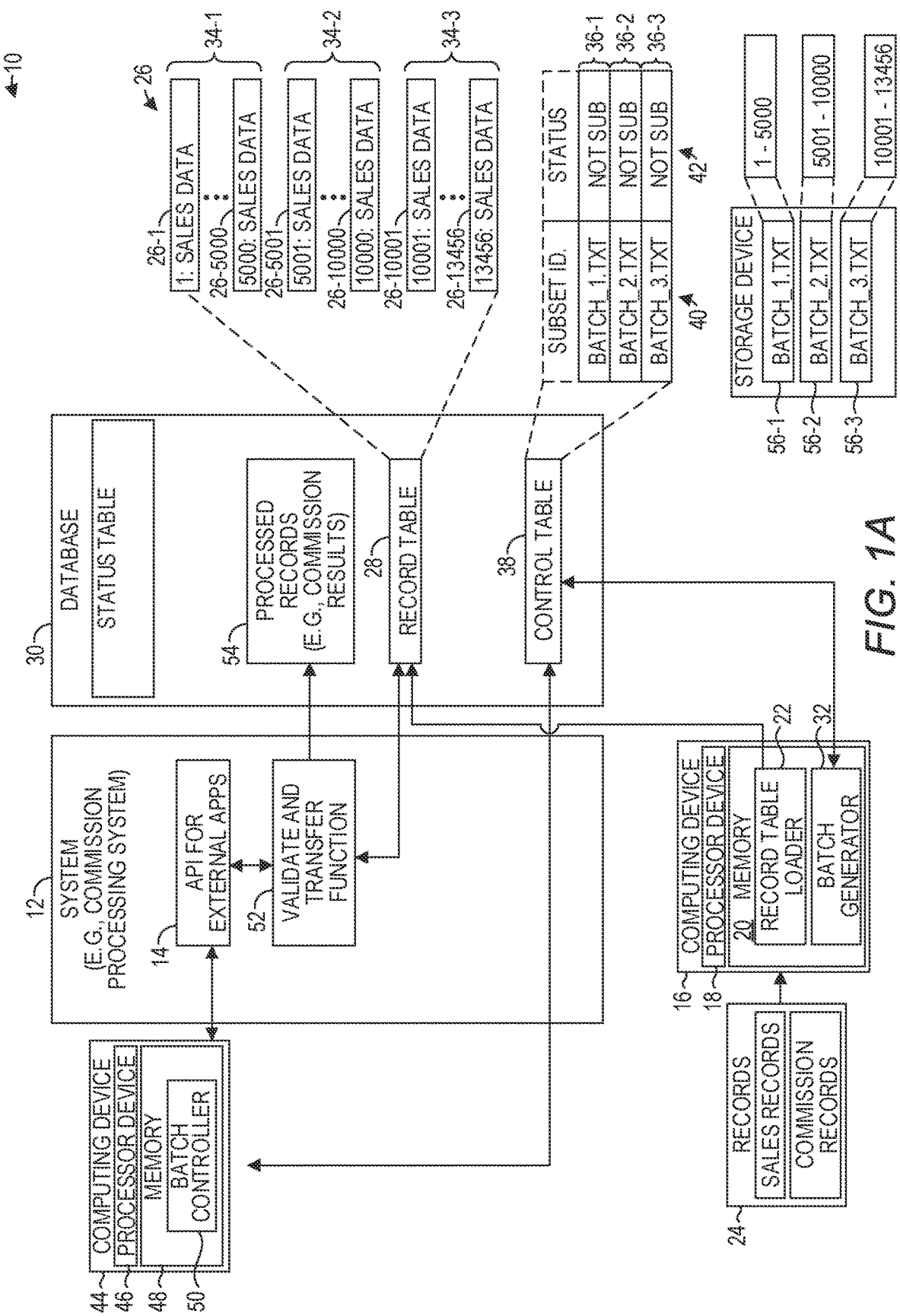
FIGS. 1A-1C are block diagrams of an environment in which embodiments can be practiced at different points in time.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A system may be provided a large number of records to process in a single processing cycle. If a problem arises at any point in the processing cycle, the entire processing may need to be reversed. If the problem arises near the end of the processing cycle, then a substantial amount of time and computing resources may have been expended for no benefit. It may also be desirable to spread the processing of a large number of records over a number of processing cycles to, for example, allow the processing to be initiated during non-peak usage times.

The embodiments disclosed herein access a plurality of records and automatically generate, from the plurality of records, a number of record groups, wherein each record group corresponds to a subset of the plurality of records. Batch transaction records that correspond to the record groups are generated, each batch transaction record including a subset identifier that references the subset of records that correspond to a particular record group, and a status field. The batch transaction records can be successively accessed, and instructions can be sent to a system to process the subset of records referenced by batch transaction record.

The embodiments can monitor the processing of the subset of records by querying the system, and if successful, the batch transaction record can be modified to indicate that the subset of records was successfully processed, and a next batch transaction record can be accessed. If the system indicates that a subset of records was not successfully processed, error handling logic can be implemented, and a desired action can be taken, such as halting further processing of subsets of records, and/or sending messages to appropriate destinations to alert individuals or systems that the processing of a subset of records resulted in an error.

FIG. 1A is a block diagram of an environment 10 in which embodiments can be practiced. The environment 10 includes a system 12 that is configured to, upon request, process a plurality of related records in a single processing execution. The system 12 executes on one or more computing devices (not illustrated) and may comprise any system that accesses records and then generates an output based on the records. In this example, the system 12 is a commission processing system that accepts sales records that identify a sale of an item, such as a product or service, and an individual responsible for the sale, and commission records that identify commission data associated with the sales record. The system 12 processes the sales records and commission records to generate commission information associated with the sales of the items. However, the embodiments disclosed herein are not limited to any particular system 12, or to a system 12 that provides any particular function.

The system 12 includes an application programming interface (API) 14 via which external applications can communicate with the system 12. The term "external applications" in this context refers to applications that are developed independently of the system 12 and have a separate code base than the system 12. An example of an external application is an application developed by an entity that has licensed the system 12 and that interacts with the system 12 via the API 14. In the embodiments described herein, the API 14 provides several functions to external applications. One such function is to, upon request, cause the system 12 to process a plurality of records. Another such function is to, upon request, determine a status of a previous request to process a plurality of records, and to respond with the status.

The environment 10 includes a computing device 16 that in turn includes a processor device 18 and a memory 20. The computing device 16, in this example, implements two functions. The first is a record table loader 22 that receives or otherwise accesses a plurality of records 24. In this example, the records 24 include sales records that identify a sale of an item, such as a product or service, and an individual responsible for the sale, and commission records that identify commission data associated with the sales record. The record table loader 22 processes the records 24 to generate a plurality of records 26 that are stored in a record table 28 of a database 30.

The computing device 16 also includes a batch generator 32 that is configured to generate a plurality of record groups 34-1-34-3 (generally, record groups 34) that correspond to subsets of the records 26. The batch generator 32 is also configured to generate batch transaction records 36-1-36-3 (generally, batch transaction records 36) that correspond to the record groups 34-1-34-3, and to store such batch transaction records 36 in a control table 38. Each batch transaction record 36 includes a subset identifier 40 that references a subset of records 26 of a record group 34 to which the batch transaction record 36 corresponds, and a status field 42.

The environment 10 also includes a computing device 44 which in turn includes a processor device 46 and a memory 48. The computing device 44 includes a batch controller 50 that is configured to access a batch transaction record 36 in the control table 38, set the status field 42 of the accessed batch transaction record 36 to a submitted value that indicates that the subset of records 26 that correspond to the batch transaction record 36 is being processed by the system 12, and send, by invoking the API 14, instructions to the system 12 to process the subset of records 26 that corresponds to the respective batch transaction record 36.

The system 12, upon receiving an instruction to process a subset of records 26, processes such records 26 via a validate and transfer function 52. The system 12 also maintains status information regarding the processing of the records 26, such as whether the records 26 are being processed, have completed successful processing, or whether an error was encountered during the processing of the records 26. In this example, the validate and transfer function 52 generates processed records 54 that comprise commission results, such as, by way of non-limiting example, how much commission is owed to a particular salesperson for a particular sale of an item.

With this background, an example of automated batch generation and subsequent submission and monitoring of batches processed by a system will be discussed. For purposes of illustration, assume that the record table loader 22 receives or otherwise accesses the plurality of records 24. The records 24 may be provided or generated by an upstream system or systems, such as a human resources system and a sales system. The record table loader 22 may process the records 24 in some desired manner to generate the records 26 or may simply store the records 24 as the records 26 in the record table 28. The batch generator 32 then accesses the records 26 to generate the plurality of record groups 34-1-34-3. The batch generator 32 may use some criteria to determine how many record groups 34 should be generated. The criteria may be contextual and based on the actual data contained within the records 26, may be predetermined, such as a maximum number of records, or may be a combination of contextual and predetermined criteria.

In this example, the batch generator 32 accesses predetermined criteria that identifies 5000 as a predetermined maximum number of records 26 in a subset of records 26. The batch generator 32 generates a plurality of record groups 34 such that each record group 34 corresponds to no more records 26 of the plurality of records 26 than the predetermined maximum number of records 26. In this example, because there are 13,456 records 26, the batch generator 32 generates three record groups 34-1-34-3, wherein the record group 34-1 corresponds to the subset of records 26-1-26-5000, the record group 34-2 corresponds to the subset of records 26-5001-26-10000, and the record group 34-3 corresponds to the subset of records 26-10001-26-13456.

The batch generator 32 generates a batch transaction record 36 for each record group 34, and thus each batch transaction record 36 corresponds to one of the record groups 34. In this example, a batch transaction record 36-1 corresponds to the record group 34-1; a batch transaction record 36-2 corresponds to the record group 34-2; and a batch transaction record 36-3 corresponds to the record group 34-3. The batch generator 32 stores in each batch transaction record 36 a subset identifier 40 that references the subset of records 26 of the record group 34 to which the batch transaction record 36 corresponds. In this example, the batch transaction record 36-1 references the subset of records 26-1-26-5000; the batch transaction record 36-2 references the subset of records 26-5001-26-10000; and the batch transaction record 36-2 references the subset of records 26-10001-26-13456. The word "references" as used in this context means that the subset identifier 40 contains information via which the subset of records 26 can be identified.

In some embodiments, the subset identifier 40 may comprise actual record numbers. For example, the subset identifier 40 of the batch transaction record 36-1 could have the value of 26-1-26-5000. In other embodiments, the batch generator 32 generates, for each of the record groups 34, a corresponding file 56 that identifies the records 26 in the subset of records 26 to which the respective record group 34 corresponds. In this example, the batch generator 32 has generated a file 56-1 that identifies the subset of records 26 to which the record group 34-1 corresponds, a file 56-2 that identifies the subset of records 26 to which the record group 34-2 corresponds, and a file 56-3 that identifies the subset of records 26 to which the record group 34-3 corresponds. The batch generator 32 stores the file identifiers of the files 56-1-56-3 as the subset identifier 40 for the corresponding batch transaction records 36-1-36-3.

The batch generator 32 may order the batch transaction records 36 in a desired processing sequence if the records 26 should be submitted to the system 12 in a certain order. The batch generator 32 may also store an initial not submitted value (e.g., "NOT SUB") in the status field 42 of each batch transaction record 36 to indicate that the subsets of records 26 that correspond to the batch transaction records 36 have not yet been submitted to the system 12 for processing.

The batch controller 50 periodically, such as once a minute, once every five minutes, once every 30 seconds or any other periodic or non-periodic interval, accesses the control table 38 to determine whether any batch transaction records 36 exist in the control table 38. The batch controller 50 may be initiated at the desired interval according to a schedule or may be configured to access the control table 38 at the interval. In this example, the batch controller 50 accesses the control table 38 and determines that there are three batch transaction records 36-1-36-3, each of which has a status field set to the value of "NOT SUB" to indicate that none of the subsets of records 26 referenced by the batch transaction records 36-1-36-3 have been submitted to the system 12 for processing.

Figure 1B:
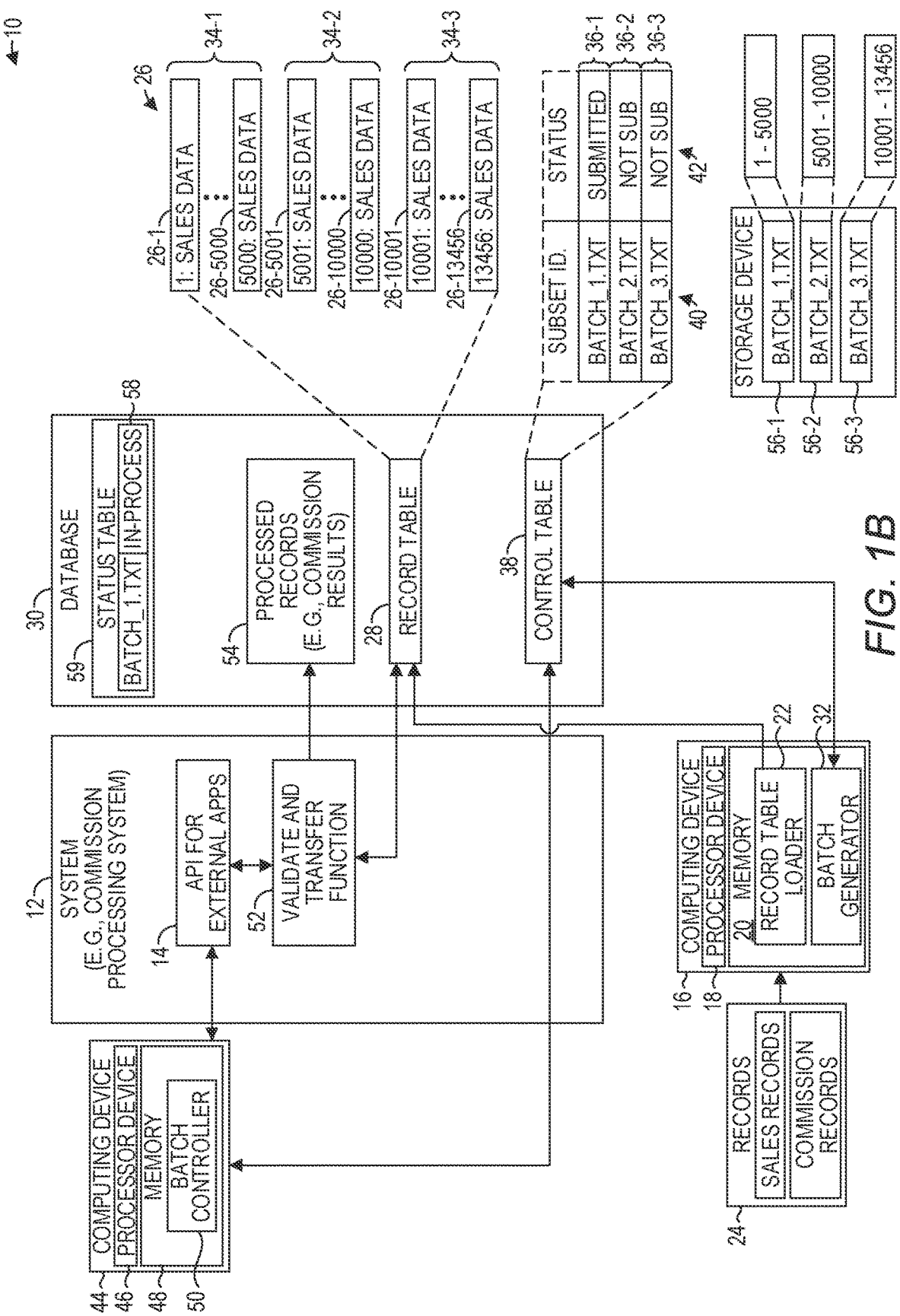

Referring now to FIG. 1B, because none of the batch transaction records 36 are currently being processed, the batch controller 50 accesses the batch transaction record 36-1, sets the value of the status field 42 to a submitted value that indicates that the first subset of records 26-1-26-5000 are being processed by the system 12, and sends instructions, by invoking the API 14, to the system 12 to process the subset of records 26-1-26-5000. The instructions may include the name of the file 56-1. In other embodiments, the batch controller 50 may access the file 56-1, extract the identifiers of the records 26-1-26-5000, and include the identifiers of the records 26-1-26-5000 in the instructions to the system 12. The instructions may also include a unique identifier that uniquely identifies the processing of the records 26-1-26-5000. In some embodiments, the unique identifier may comprise the name of the file 56-1. The batch controller 50 then either terminates, or waits until the next interval, which in this example is 60 seconds.

The validate and transfer function 52 receives the instructions to process the subset of records 26-1-26-5000. If the instructions included the file identifier of the file 56-1, the validate and transfer function 52 accesses the file 56-1 to obtain the identifiers of the records 26-1-26-5000. The validate and transfer function 52 may generate a status record 58 in a status table 59 that corresponds to the processing of the subset of records 26-1-26-5000 that includes the unique identifier and that contains a current status of the processing of the records 26-1-26-5000.

After the interval, the batch controller 50 again accesses the control table 38 to determine whether any batch transaction records 36 exist in the control table 38. The batch controller 50 determines that there are three batch transaction records 36-1-36-3, and that the status field 42 of the batch transaction record 36-1 has the submitted value. In this embodiment, the subset identifier 40 is a unique identifier that is used not only to identify the subset of records 26 that correspond to a particular batch transaction record 36, but is also used by the validate and transfer function 52 to track the status of the processing of the corresponding subset of records 26. The batch controller 50 sends the system 12 a query, via the API 14, to determine a status of the subset of records 26-1-26-5000. The query may include the unique subset identifier 40 (BATCH_1.TXT) of the batch transaction record 36-1. The system 12 accesses the status record 58 and determines that the subset of records 26 are being processed and provides a being processed response that indicates that the subset of records 26 is being processed by the system 12. Because the subset of records 26 is being processed, the batch controller 50 then inhibits altering the status field 42 of the batch transaction record 36-1 and inhibits sending instructions to the system 12 to process another subset of records 26. The batch controller 50 either terminates or waits until the next interval.

Figure 1C:
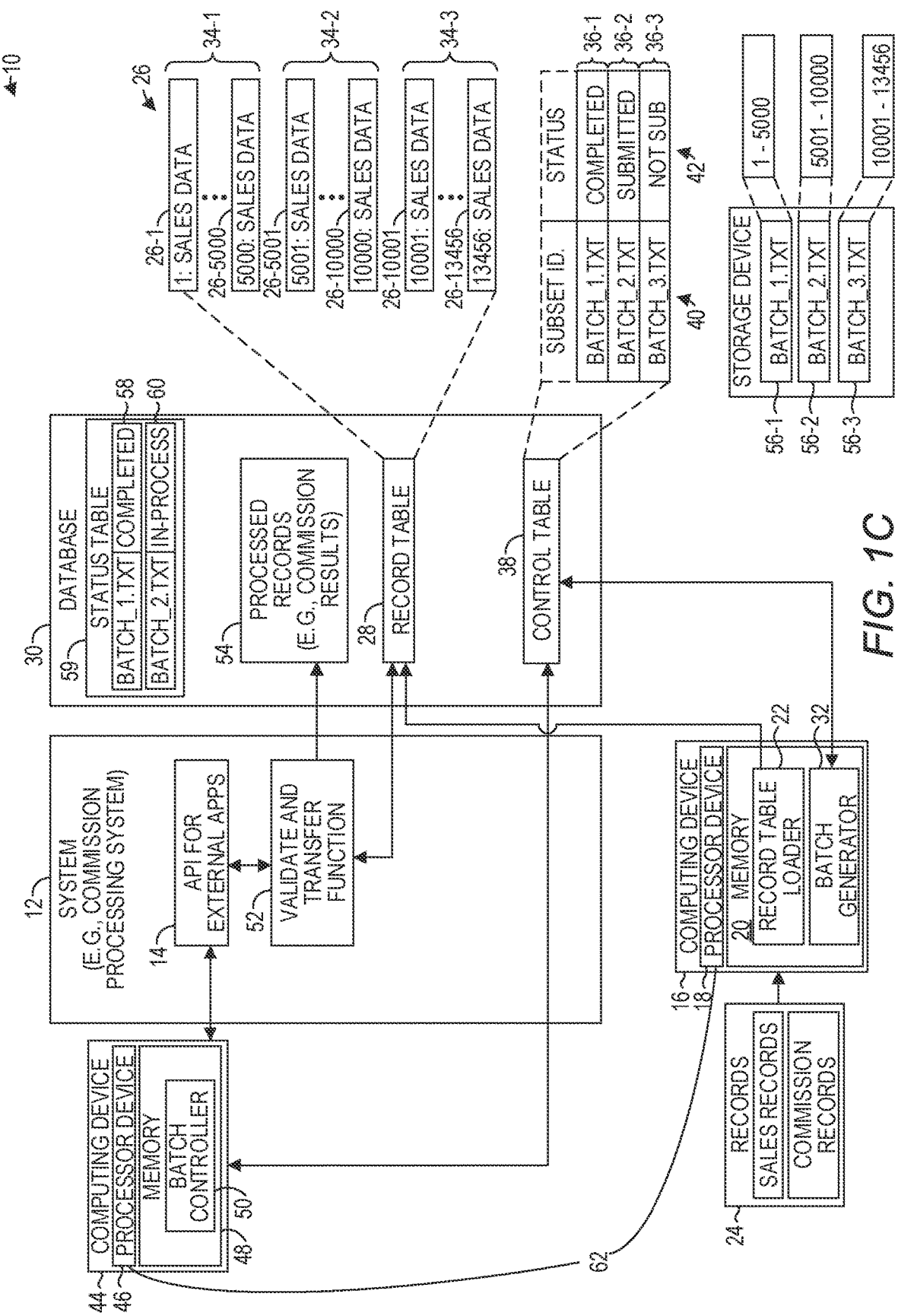

Referring now to FIG. 1C, the validate and transfer function 52 finishes processing the subset of records 26-1-26-5000 successfully and updates the status record 58 to indicate that the subset of records 26-1-26-5000 was successfully processed. After the interval, the batch controller 50 again accesses the control table 38 to determine whether any batch transaction records 36 exist in the control table 38. The batch controller 50 determines that there are three batch transaction records 36-1-36-3, and that the status field 42 of the batch transaction record 36-1 has the submitted value. The batch controller 50 sends the system 12 a query, via the API 14, to determine a status of the subset of records 26-1-26-5000. The query may include the unique subset identifier 40 (BATCH_1.TXT) of the batch transaction record 36-1. The system 12 accesses the status record 58 and determines that the subset of records 26 was successfully completed and provides a success status response that indicates that the subset of records 26 was successfully processed. In response to receiving the success status, the batch controller 50 then sets the status field 42 of the batch transaction record 36-1 to a completed value that indicates that the subset of records 26 that corresponds to the batch transaction record 36 has been successfully processed by the system 12.

The batch controller 50 determines that the status field 42 of the batch transaction record 36-2 has a not submitted value and thus that the subset of records 26-5001-26-10000 referenced by the batch transaction record 36-2 has not been submitted to the system 12 for processing. The batch controller 50 accesses the batch transaction record 36-2, sets the value of the status field 42 to the submitted value that indicates that the subset of records 26-5001-26-10000 are being processed by the system 12, and sends instructions, by invoking the API 14, to the system 12 to process the subset of records 26-5001-26-10000. The instructions may include the name of the file 56-2 or may identify the subset of records 26-5001-26-10000 directly.

The validate and transfer function 52 receives the instructions to process the subset of records 26-5001-26-10000. The validate and transfer function 52 may generate a status record 60 that corresponds to the instruction that includes the unique identifier and that contains a current status of the processing of the subset of records 26-5001-26-10000.

In this manner, the batch controller 50 iteratively, until each status field 42 of each respective batch transaction record 36-1-36-3 has the completed value, determines that the system 12 has completed processing a previously submitted subset of records 26, sets the status field 42 of the batch transaction record 36 that identifies the previously submitted subset of records 26 to the completed value, accesses the plurality of batch transaction records 36-1-36-3 to identify, based on the value of the status field 42, a respective batch transaction record 36 that has not been submitted to the system 12 for processing, sets the status field 42 of the respective batch transaction record 36 to the submitted value, and sends, to the system 12, instructions to process the subset of records 26 referenced by the respective batch transaction record 36.

It is noted that, because the batch controller 50 and the batch generator 32 are components of computing devices, functionality implemented by the batch controller 50 and the batch generator 32 may be attributed to a computing device generally. Moreover, in examples where the batch controller 50 and the batch generator 32 comprise software instructions that program a processor device to carry out functionality discussed herein, functionality implemented by the batch controller 50 and the batch generator 32 may be attributed herein to a processor device.

It is further noted that while the batch controller 50 and the batch generator 32 are shown as separate components, in other implementations, the batch controller 50 and the batch generator 32 could be implemented in a single component or could be implemented in a greater number of components than two. Finally, it is noted that while, for purposes of illustration and simplicity, the batch controller 50 and the batch generator 32 are illustrated as being implemented on different computing devices, in other embodiments, the batch controller 50 and the batch generator 32 may be implemented on a single computing device.

In some embodiments, the batch controller 50 and the batch generator 32 may be implemented on a processor device set 62 that comprises one or more processor devices implemented on one or more computing devices. In the environment 10, the processor device set includes the processor devices 18 and 46 implemented on the computing devices 16 and 44, respectively, but, in other embodiments, the processor device set may comprise a single processor device on a single computing device. Thus, irrespective of the implementation, the embodiments may be implemented on a computer system that includes a processor device set made up of one or more processor devices of one or more computing devices.

Figure 2:
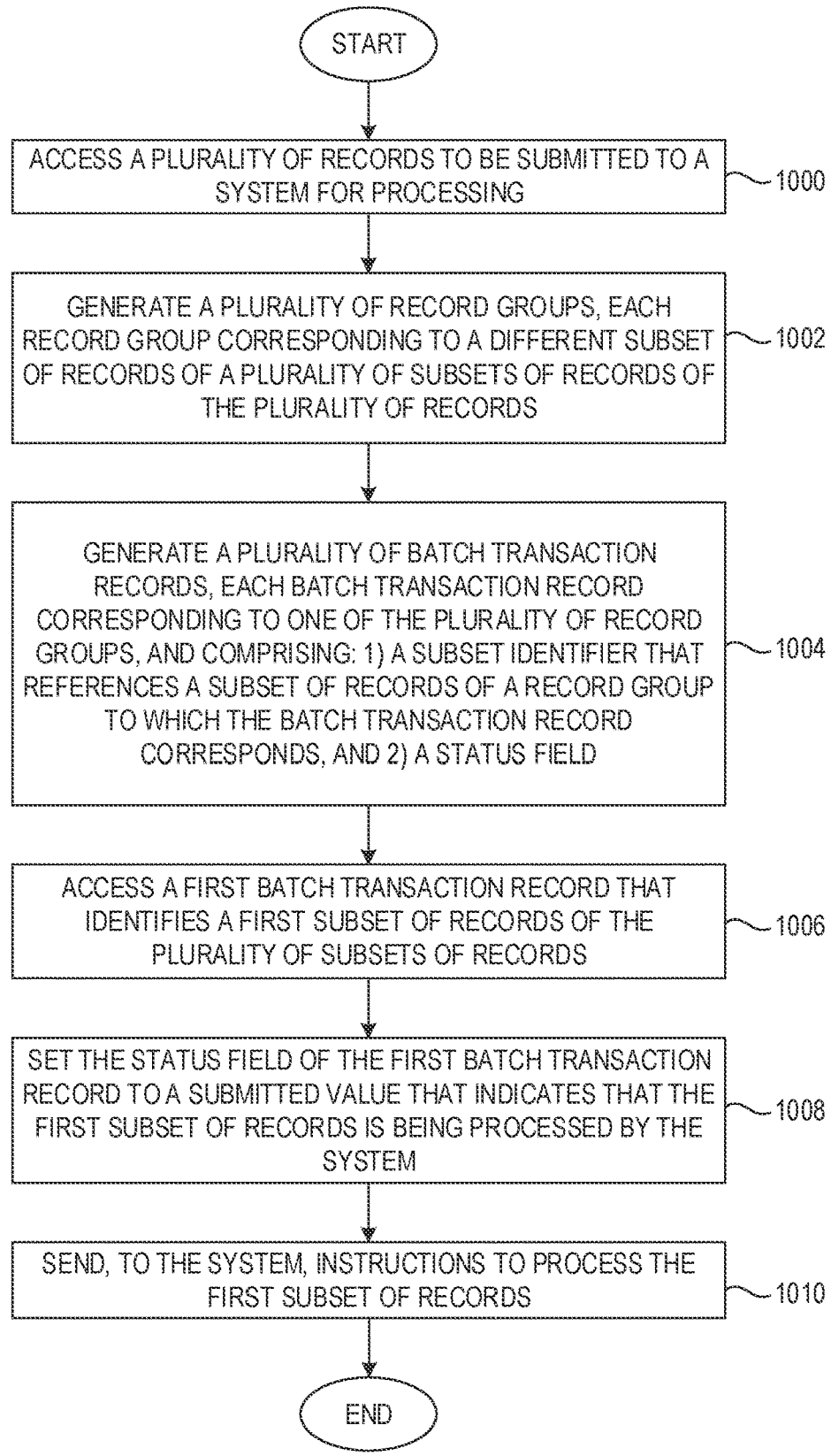
FIG. 2 is a flowchart of a method for automated batch generation and subsequent submission and monitoring of batches processed by a system, according to one embodiment.

FIG. 2 is a flowchart of a method for automated batch generation and subsequent submission and monitoring of batches processed by a system, according to one embodiment. FIG. 2 will be discussed in conjunction with FIGS. 1A-1C. The processor device set 62 accesses the plurality of records 24 to be submitted to the system 12 for processing (FIG. 2, block 1000). The processor device set 62 generates the plurality of record groups 34-1-34-3, each record group 34-1-34-3 corresponding to a different subset of records 26 of a plurality of subsets of records 26 of the plurality of records 26 (FIG. 2, block 1002). The processor device set 62 generates a plurality of batch transaction records 36-1-36-3, each batch transaction record 36 corresponding to one of the plurality of record groups 34 and comprising: 1) a subset identifier 40 that references a subset of records 26 of a record group 34 to which the batch transaction record 36 corresponds, and 2) a status field 42 (FIG. 2, block 1004). The processor device set 62 accesses a batch transaction record 36 that identifies a subset of records 26 of the plurality of subsets of records 26 (FIG. 2, block 1006). The processor device set 62 sets the status field 42 of the batch transaction record 36 to a submitted value that indicates that the subset of records 26 is being processed by the system 12 (FIG. 2, block 1008). The processor device set 62 sends, to the system 12, instructions to process the subset of records 26 (FIG. 2, block 1010).

FIG. 3 is a block diagram of a layout of a batch transaction record 36 according to another embodiment. In this embodiment, the batch transaction record 36 includes a batch sequence field 64 (BATCHSEQ) that identifies a sequential order for processing with respect to other batch transaction records 36. The batch transaction record 36 includes the subset identifier 40. In this embodiment, the batch transaction record 36 includes a master batch name field 66 (MB_NAME) that is associated with a set of the records 26. The batch transaction record 36 also includes a master batch status field 68, and the status field 42.

Figure 4:
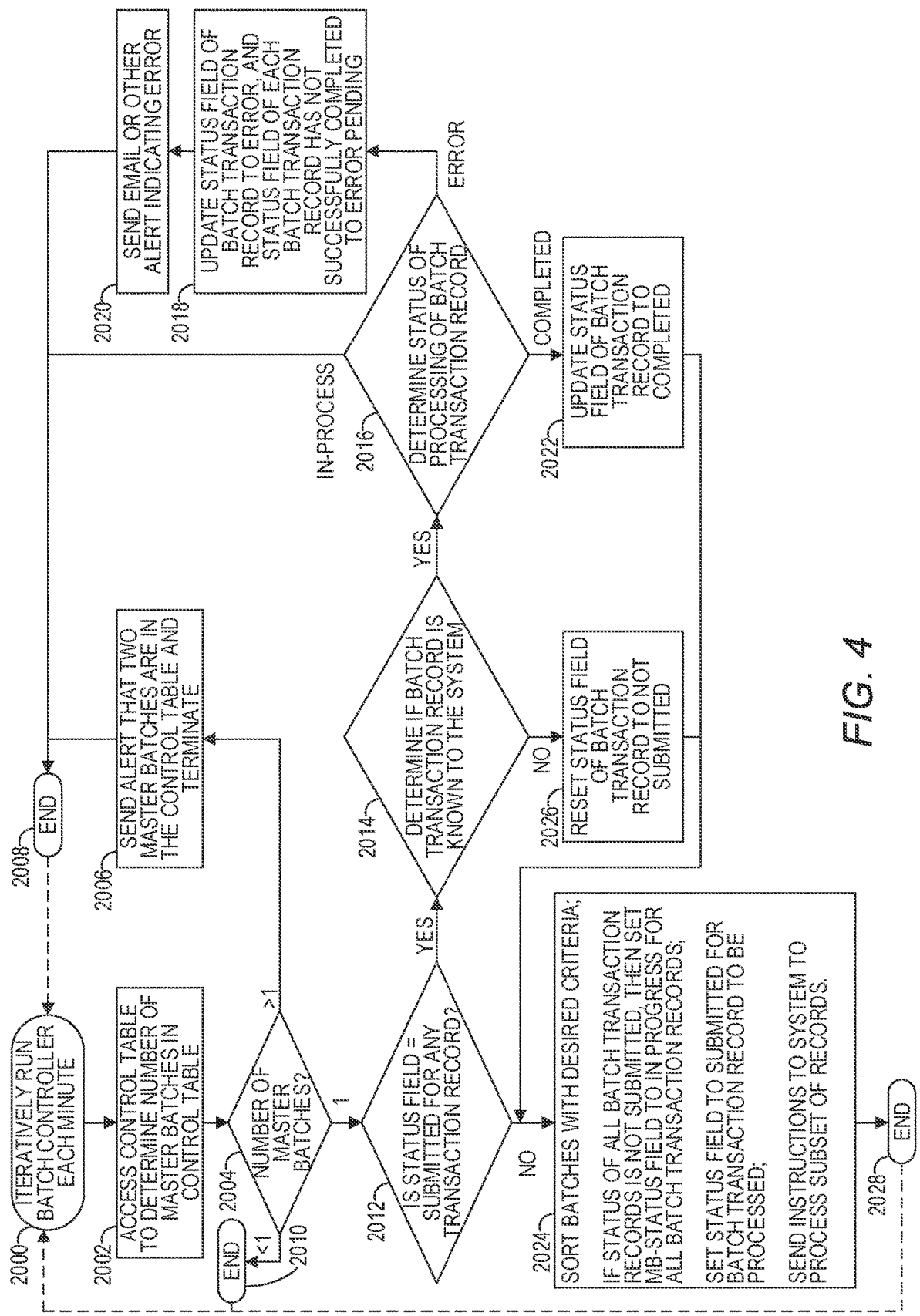
FIG. 4 is a flowchart of a method for automated batch generation and subsequent submission and monitoring of batches processed by a system, according to another embodiment.

FIG. 4 is a flowchart of a method for automated batch generation and subsequent submission and monitoring of batches processed by a system, according to another embodiment. FIG. 4 will be discussed in conjunction with FIGS. 1A-1C and FIG. 3. In this embodiment, at block 2000, the batch controller 50 is initiated at periodic intervals of one minute. After the batch controller 50 has implemented certain processing, as described in detail below, the batch controller 50 terminates, and is then re-initiated at the periodic interval.

At block 2002, the batch controller 50 accesses the control table 38 to determine the number of master batches identified in the control table 38 based on the value of the master batch name field 66 identified in the batch transaction records 36. In this embodiment, if the batch transaction records 36 do not all have the same master batch name identified in the master batch name field 66, this is considered an error condition. As an example as to how this may occur, the batch generator 32 may store new records in the control table 38 on a periodic basis, such as each day, and generate corresponding batch transaction records 36 as described above. Each day, the batch generator 32 gives each newly generated batch transaction record 36 the same master batch name that is different from the master batch name assigned to batch transaction records 36 generated on previous days.

The batch transaction records 36 that were stored in the control table 38 the previous day should have been processed and removed from the control table 38 prior to the batch generator 32 generating new batch transaction records 36 with a new master batch name. Thus, if at block 2004 the batch controller 50 determines that the batch transaction records 36 identify more than one master batch name, processing continues to block 2006 where the batch controller 50 sends an alert, such as an email, that indicates there are multiple master batch names in the control table 38. The batch controller 50 may also set the status field 42 to an error value that indicates that there is more than one master batch name in the control table 38. The batch controller 50 then terminates at block 2008.

If at block 2004 the batch controller 50 determines that there are no batch transaction records 36 in the control table 38, the batch controller 50 terminates at block 2010. If at block 2004 the batch controller 50 determines that there is a single master batch name in all the batch transaction records 36, processing continues to block 2012. At block 2012, the batch controller 50 determines if any of the batch transaction records 36 have a submitted value in the status field 42. If so, then at block 2014, the batch controller 50 determines whether the system 12 has a record of the respective batch transaction record 36. This may be accomplished, as discussed above, by querying the system 12 via the API 14. In other embodiments, the batch controller 50 may be able to access the status able 59 directly and determine whether a status record that corresponds to the respective batch transaction record 36 exists in the status table 59. If so, then at block 2016, the batch controller 50 determines the status of the processing of the respective batch transaction record 36 by the system 12. Again, this may be accomplished, as discussed above, by querying the system 12 via the API 14, or, in other embodiments, by directly accessing the status table 59. If the status indicates that the subset of records 26 referenced by the respective batch transaction record 36 is being processed by the system 12, then at block 2008 the batch controller 50 terminates at block 2008.

If the status indicates that an error occurred during the processing of records 26, at block 2018 the batch controller 50 sets the status field 42 of the respective batch transaction record 36 to an error value. The batch controller 50 sets the status field 42 of each other batch transaction record 36 that does not have a completed value to an error pending value. In this manner, it can later be determined exactly which batch transaction record 36 caused the error, which batch transaction records 36 had already completed, and which batch transaction records 36 still need to be processed. At block 2020, the batch controller 50 sends an email or other alert to indicate that there is a processing error. The batch controller 50 terminates at block 2008.

If at block 2016 the status indicates that the processing of the subset of records 26 referenced by the respective batch transaction record 36 has successfully completed, at block 2022 the batch controller 50 updates the status field 42 of the respective batch transaction record 36 to a value of completed, and processing continues at block 2024.

If at block 2014 the batch controller 50 determines that the system 12 has no record that corresponds to the respective batch transaction record 36, then at block 2026 the batch controller 50 resets the status field 42 of the batch transaction record 36 to a value of not submitted, and processing continues at block 2024.

At block 2024, the batch controller 50 sorts the batch transaction records 36 according to desired criteria. In this embodiment, the criterion is the batch sequence field 64 of the batch transaction records 36. The batch controller 50 determines whether the status field 42 of all the batch transaction records 36 is not submitted. If so, then this is the first iteration of the batch controller 50 for this master batch. The batch controller 50 sets the master batch status field 68 of all the batch transaction records 36 to a value of in progress.

The batch controller 50 identifies a next batch transaction record 36 to process. The batch controller 50 sets the status field 42 of the next batch transaction record 36 to be processed to a value of submitted. The batch controller 50 then instructs the system 12 to process the subset of records 26 that are associated with the next batch transaction record 36. The batch controller 50 then terminates at block 2028.

Figure 5:
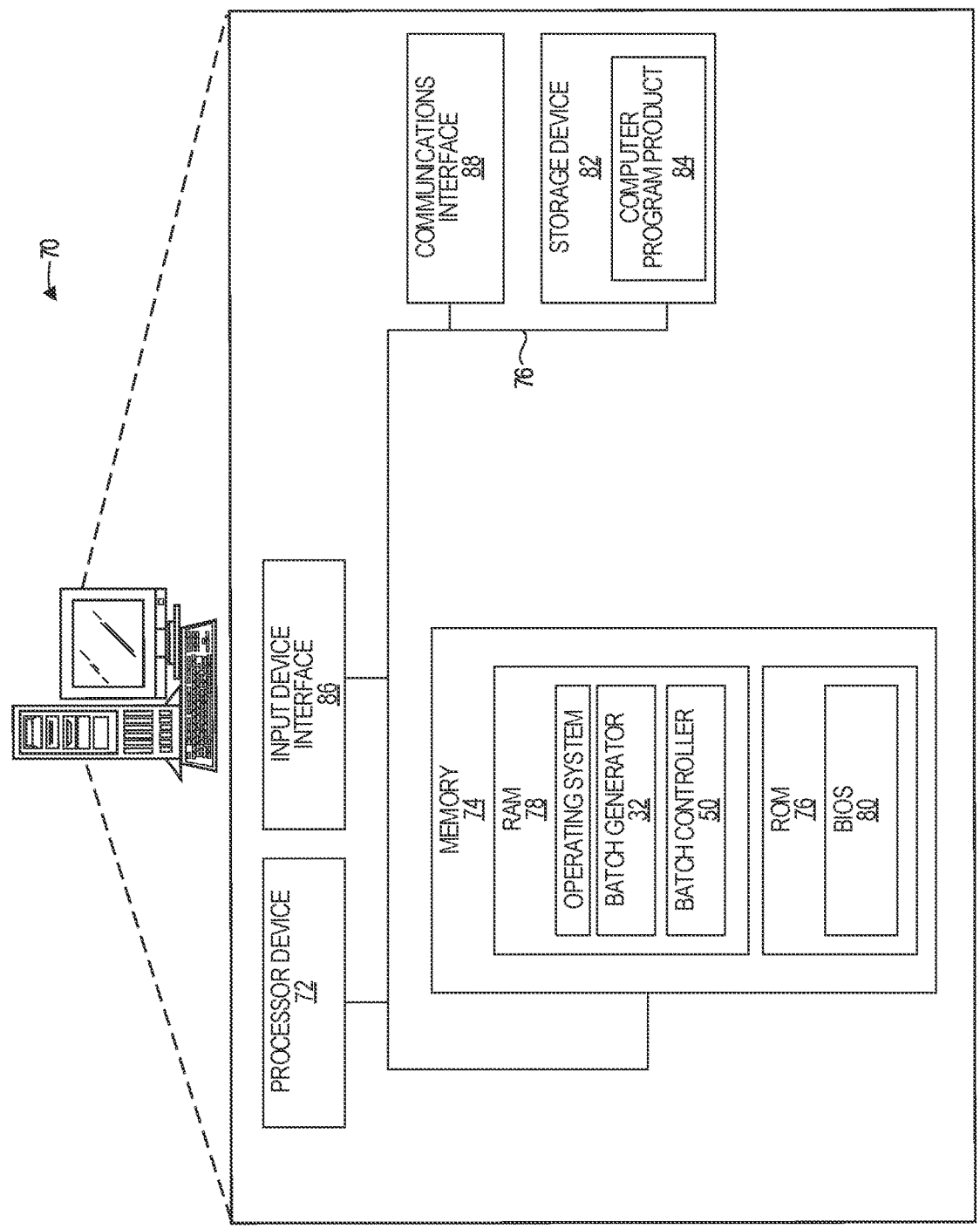
FIG. 5 is a block diagram of a computing device suitable for implementing embodiments disclosed herein.

FIG. 5 is a block diagram of a computing device 70 suitable for implementing embodiments disclosed herein. The computing device 70 may comprise any computing or electronic device capable of including firmware, hardware, and/or executing software instructions to implement the functionality described herein, such as a computer server, a desktop computing device, a laptop computing device, or the like. The computing device 70 includes a processor device 72, a system memory 74, and a system bus 76. The system bus 76 provides an interface for system components including, but not limited to, the system memory 74 and the processor device 72. The processor device 72 can be any commercially available or proprietary processor.

The system bus 76 may be any of several types of bus structures that may further interconnect to a memory bus (with or without a memory controller), a peripheral bus, and/or a local bus using any of a variety of commercially available bus architectures. The system memory 74 may include non-volatile memory 76 (e.g., read-only memory (ROM), erasable programmable read-only memory (EPROM), electrically erasable programmable read-only memory (EEPROM), etc.), and volatile memory 78 (e.g., random-access memory (RAM)). A basic input/output system (BIOS) 80 may be stored in the non-volatile memory 76 and can include the basic routines that help to transfer information between elements within the computing device 70. The volatile memory 78 may also include a high-speed RAM, such as static RAM, for caching data.

The computing device 70 may further include or be coupled to a non-transitory computer-readable storage medium such as a storage device 82, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 82 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 82 and in the volatile memory 78, including an operating system and one or more program modules, such as the batch generator 32 and the batch controller 50, which may implement the functionality described herein in whole or in part.

All or a portion of the examples may be implemented as a computer program product 84 stored on a transitory or non-transitory computer-usable or computer-readable storage medium, such as the storage device 82, which includes complex programming instructions, such as complex computer-readable program code, to cause the processor device 72 to carry out the steps described herein. Thus, the computer-readable program code can comprise software instructions for implementing the functionality of the examples described herein when executed on the processor device 72.

An operator may also be able to enter one or more configuration commands through a keyboard (not illustrated), a pointing device such as a mouse (not illustrated), or a touch-sensitive surface such as a display device. Such input devices may be connected to the processor device 72 through an input device interface 86 that is coupled to the system bus 76 but can be connected by other interfaces such as a parallel port, an Institute of Electrical and Electronic Engineers (IEEE) 1394 serial port, a Universal Serial Bus (USB) port, an IR interface, and the like. The computing device 70 may also include a communications interface 88 suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   accessing, by a processor device set comprising one or more processor devices, a plurality of records to be submitted to a system for processing, the system comprising an interface via which external applications can communicate with the system;
   generating, by the processor device set based on a criterion, a plurality of record groups, each record group corresponding to a different subset of records of a plurality of subsets of records of the plurality of records, each record of the plurality of records being associated with one of the record groups of the plurality of record groups;
   prior to submitting any of the plurality of records to the system for processing:
      generating, for each respective record group, a corresponding file; and
      storing, in the corresponding file, record identifiers that identify records in the subset of records to which the respective record group corresponds;
   prior to submitting any of the plurality of records to the system for processing, generating, for each record group of the plurality of record groups, a corresponding batch transaction record of a plurality of batch transaction records, each batch transaction record corresponding to one of the plurality of record groups, and comprising: 1) a subset identifier that references a subset of records of a record group to which the batch transaction record corresponds, wherein the subset identifier comprises a corresponding file that comprises the record identifiers that identify the records in the subset of records and 2) a status field comprising a value indicating that the subset of records has not been submitted to the system for processing;
   accessing, by a batch controller external application that has a separate code base from a code base of the system, a first batch transaction record that identifies a first subset of records of the plurality of subsets of records;
   prior to submitting the first subset of records to the system for processing, setting, by the batch controller external application, the status field of the first batch transaction record to a submitted value that indicates that the first subset of records is being processed by the system; and
   sending, by the batch controller external application to the system via the interface, instructions to process the first subset of records, the instructions comprising the subset identifier that references the first subset of records.

2. The method of claim 1 wherein the subset identifier for each respective batch transaction record comprises a file identifier of a file that identifies the subset of records to which the respective batch transaction record corresponds.

3. The method of claim 1 wherein the interface comprises an application programming interface and wherein sending the instructions comprises:
   invoking the application programming interface of the system; and
   passing, to the application programming interface, the subset identifier.

4. The method of claim 1 further comprising:
   subsequent to sending the instructions to the system, accessing the first batch transaction record;
   determining, by the batch controller external application, that the value of the status field of the first batch transaction record is the submitted value;
   in response to determining that the value of the status field is the submitted value, sending, by the batch controller external application via the interface, a query to the system to determine a status of the first subset of records;
   receiving, by the batch controller external application from the system via the interface, a success status that indicates that the first subset of records has been successfully processed; and
   in response to receiving the success status, setting, by the batch controller external application, the status field of the first batch transaction record to a completed value that indicates that the first subset of records has been successfully processed.

5. The method of claim 4 further comprising:
subsequent to setting the status field of the first batch transaction record to the completed value, accessing, by the batch controller external application, a second batch transaction record that identifies a second subset of records that is different from the first subset of records;
determining, by the batch controller external application, that the second batch transaction record has not been submitted to the system for processing by the system;
setting, by the batch controller external application, the status field of the second batch transaction record to the submitted value; and
sending, by the batch controller external application via the interface, instructions to the system to process the second subset of records.

6. The method of claim 4 wherein sending the query to the system to determine the status of the first subset of records further comprises:
accessing, by the batch controller external application, a unique identifier field of the first batch transaction record to obtain a unique identifier that corresponds to the first subset of records; and
sending, by the batch controller external application via the interface, the query with the unique identifier to the system to determine the status of the first subset of records.

7. The method of claim 1 further comprising:
iteratively, until each status field of each respective batch transaction record has a completed value:
determining, by the batch controller external application, that the system has completed processing a previously submitted subset of records;
setting, by the batch controller external application, the status field of the batch transaction record that identifies the previously submitted subset of records to the completed value;
accessing, by the batch controller external application, the plurality of batch transaction records to identify, based on the value of the status field, a respective batch transaction record that has not been submitted to the system for processing;
setting, by the batch controller external application, the status field of the respective batch transaction record to the submitted value; and
sending, by the batch controller external application to the system via the interface, instructions to process the subset of records referenced by the respective batch transaction record.

8. The method of claim 1 further comprising:
subsequent to sending the instructions to the system, accessing, by the batch controller external application, the first batch transaction record;
determining, by the batch controller external application, that the value of the status field of the first batch transaction record is the submitted value;
in response to determining that the value of the status field is the submitted value, sending, by the batch controller external application via the interface, a query to the system to determine a status of the first subset of records;
receiving, by the batch controller external application from the system via the interface, an error status that indicates that an error occurred during the processing of the first subset of records; and
in response to receiving the error status, setting, by the batch controller external application, the status field of the first batch transaction record to an error value that indicates that the first subset of records was not successfully processed.

9. The method of claim 8 further comprising:
setting, by the batch controller external application, the status field of each batch transaction record of the plurality of batch transaction records that does not have a completed value to an error pending value that indicates that a subset of records referenced by a different batch transaction record was not successfully processed.

10. The method of claim 1 further comprising:
prior to setting the status field of the first batch transaction record to the submitted value, setting, by the batch controller external application, the status field of each batch transaction record to a not submitted value that indicates that each batch transaction record has not yet been submitted to the system for processing.

11. The method of claim 1 wherein generating the plurality of record groups comprises:
determining a predetermined maximum number of records; and
generating the plurality of record groups such that each record group corresponds to no more records of the plurality of records than the predetermined maximum number of records.

12. The method of claim 1 wherein each record of a first set of records of the plurality of records identifies a corresponding sale of an item and an individual responsible for the sale, and a second set of records of the plurality of records identifies commission data, and wherein the system processes the plurality of records to generate commission information associated with the sale of the items.

13. The method of claim 1 further comprising:
subsequent to sending the instructions to the system, accessing, by the batch controller external application, the first batch transaction record;
determining, by the batch controller external application, that the value of the status field of the first batch transaction record is the submitted value;
in response to determining that the value of the status field is the submitted value, sending, by the batch controller external application via the interface, a query to the system to determine a status of first subset of records;
receiving, by the batch controller external application from the system, a being processed status that indicates that the first subset of records is being processed by the system; and
in response to receiving the being processed status, inhibiting, by the batch controller external application, altering the status field of the first batch transaction record, and inhibiting sending, to the system, instructions to process a second subset of records.

14. The method of claim 1 further comprising:
determining that the plurality of subsets of records has been processed by the system;
deleting the plurality of batch transaction records;
accessing a plurality of second records to be submitted to the system for processing;
generating a plurality of second record groups, each second record group corresponding to a different subset of second records of a plurality of subsets of second records of the plurality of second records; and
generating a plurality of second batch transaction records, each second batch transaction record corresponding to one of the plurality of second record groups, and comprising: 1) a subset identifier that references a subset of second records of a second record group to which the second batch transaction record corresponds, and 2) a status field.

15. The method of claim 1, wherein:
each batch transaction record of the plurality of batch transaction records further comprises a batch sequence field that identifies a sequential order for processing with respect to other batch transaction records of the plurality of batch transaction records; and
further comprising:
  prior to accessing the first batch transaction record, sorting, by the batch controller external application, the plurality of batch transaction records by the batch sequence field.

16. A computer system comprising:
a processor device set comprising one or more processor devices of one or more computing devices, the processor device set configured to:
  access a plurality of records to be submitted to a system for processing, the system comprising an interface via which external applications can communicate with the system;
  generate, based on a criterion, a plurality of record groups, each record group corresponding to a different subset of records of a plurality of subsets of records of the plurality of records, each record of the plurality of records being associated with one of the record groups of the plurality of record groups;
  prior to submitting any of the plurality of records to the system for processing:
    generate, for each respective record group, a corresponding file; and
    store, in the corresponding file, record identifiers that identify records in the subset of records to which the respective record group corresponds;
  prior to submitting any of the plurality of records to the system for processing, generate for each record group of the plurality of record groups, a corresponding batch transaction record of a plurality of batch transaction records, each batch transaction record corresponding to one of the plurality of record groups, and comprising: 1) a subset identifier that references a subset of records of a record group to which the batch transaction record corresponds, wherein the subset identifier comprises a corresponding file that comprises the record identifiers that identify the records in the subset of records and 2) a status field comprising a value indicating that the subset of records has not been submitted to the system for processing;
  access, by a batch controller external application that has a separate code base from a code base of the system, a first batch transaction record that identifies a first subset of records of the plurality of subsets of records;
  prior to submitting the first subset of records to the system for processing, set, by the batch controller external application, the status field of the first batch transaction record to a submitted value that indicates that the first subset of records is being processed by the system; and
  send, by the batch controller external application to the system via the interface, instructions to process the first subset of records, the instructions comprising the subset identifier that references the first subset of records.

17. The computer system of claim 16 wherein the processor device set is further configured to:
  subsequent to sending the instructions to the system, access the first batch transaction record;
  determine, by the batch controller external application, that the value of the status field of the first batch transaction record is the submitted value;
  in response to determining that the value of the status field is the submitted value, send, by the batch controller external application via the interface, a query to the system to determine a status of the first subset of records;
  receive, by the batch controller external application from the system via the interface, a success status that indicates that the first subset of records has been successfully processed; and
  in response to receiving the success status, set, by the batch controller external application, the status field of the first batch transaction record to a completed value that indicates that the first subset of records has been successfully processed.

18. A non-transitory computer-readable storage medium that includes executable instructions to cause one or more processor devices to:
  access a plurality of records to be submitted to a system for processing, the system comprising an interface via which external applications can communicate with the system;
  generate, based on a criterion, a plurality of record groups, each record group corresponding to a different subset of records of a plurality of subsets of records of the plurality of records, each record of the plurality of records being associated with one of the record groups of the plurality of record groups;
  prior to submitting any of the plurality of records to the system for processing:
    generate, for each respective record group, a corresponding file; and
    store, in the corresponding file, record identifiers that identify records in the subset of records to which the respective record group corresponds;
  prior to submitting any of the plurality of records to the system for processing, generate, for each record group of the plurality of record groups, a corresponding batch transaction record of a plurality of batch transaction records, each batch transaction record corresponding to one of the plurality of record groups, and comprising: 1) a subset identifier that references a subset of records of a record group to which the batch transaction record corresponds, wherein the subset identifier comprises the corresponding file that comprises the record identifiers that identify the records in the subset of records and 2) a status field comprising a value indicating that the subset of records has not been submitted to the system for processing;
  access, by a batch controller external application that has a separate code base from a code base of the system, a first batch transaction record that identifies a first subset of records of the plurality of subsets of records;
  prior to submitting the first subset of records to the system for processing, set, by the batch controller external application, the status field of the first batch transaction record to a submitted value that indicates that the first subset of records is being processed by the system; and
  send, by the batch controller external application to the system via the interface, instructions to process the first subset of records, the instructions comprising the subset identifier that references the first subset of records.

19. The non-transitory computer-readable storage medium of claim 18 wherein the instructions further cause one or more processor devices to:
- subsequent to sending the instructions to the system, access the first batch transaction record;
- determine, by the batch controller external application, that the value of the status field of the first batch transaction record is the submitted value;
- in response to determining that the value of the status field is the submitted value, send, by the batch controller external application via the interface, a query to the system to determine a status of the first subset of records;
- receive, by the batch controller external application from the system via the interface, a success status that indicates that the first subset of records has been successfully processed; and
- in response to receiving the success status, set, by the batch controller external application, the status field of the first batch transaction record to a completed value that indicates that the first subset of records has been successfully processed.

\* \* \* \* \*